(12) United States Patent
Natori et al.

(10) Patent No.: US 10,068,360 B2
(45) Date of Patent: Sep. 4, 2018

(54) DISPLAY DEVICE, DISPLAY CONTROL METHOD AND DISPLAY SYSTEM FOR DETECTING A FIRST INDICATOR AND A SECOND INDICATOR

(71) Applicant: Seiko Epson Corporation, Tokyo (JP)

(72) Inventors: Takashi Natori, Suwa (JP); Takashi Ozawa, Shiojiri (JP); Shun Imai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 14/938,502

(22) Filed: Nov. 11, 2015

(65) Prior Publication Data

US 2016/0140745 A1    May 19, 2016

(30) Foreign Application Priority Data

Nov. 19, 2014 (JP) .................................. 2014-234266
Feb. 20, 2015 (JP) .................................. 2015-031434

(51) Int. Cl.
| | | |
|---|---|---|
| *G06F 3/01* | (2006.01) | |
| *G06T 11/60* | (2006.01) | |
| *G06F 3/0488* | (2013.01) | |
| *G06F 3/041* | (2006.01) | |
| *G06F 3/0354* | (2013.01) | |

(52) U.S. Cl.
CPC .......... *G06T 11/60* (2013.01); *G06F 3/03545* (2013.01); *G06F 3/0416* (2013.01); *G06F 3/0488* (2013.01); *G06F 2203/04106* (2013.01)

(58) Field of Classification Search
CPC .................................. G06F 3/01; G06F 3/017
USPC ........................................................... 345/629
See application file for complete search history.

(56) References Cited

U.S. PATENT DOCUMENTS

| | | | |
|---|---|---|---|
| 7,734,572 B2 | 6/2010 | Wiemeyer et al. | |
| 2011/0154192 A1* | 6/2011 | Yang ................... | G06F 17/2288 715/256 |
| 2011/0169756 A1 | 7/2011 | Ogawa et al. | |

(Continued)

FOREIGN PATENT DOCUMENTS

| | | |
|---|---|---|
| JP | 2011-143557 A | 7/2011 |
| JP | 2013-20637 A | 1/2013 |

(Continued)

*Primary Examiner* — Shivang Patel
(74) *Attorney, Agent, or Firm* — ALG Intellectual Property, LLC

(57) ABSTRACT

A display device includes: an acquisition unit which acquires a first image from an image supply device; a detection unit which specifies a position of the indicator and whether the indicator is a first indicator or a second indicator; a generation unit which generates a second image based on the specified position and generates a third image by superimposing the second image on the first image; a display unit which displays the third image; a designation unit which designates either the generation unit or the image supply device as a supply destination of information indicating a position of the second indicator; and a control unit which supplies the information indicating the position of the indicator to the generation unit if the detected indicator is the first indicator, and supplies the information indicating the position of the indicator to the supply destination if the detected indicator is the second indicator.

13 Claims, 9 Drawing Sheets

(56) References Cited

U.S. PATENT DOCUMENTS

| | | | | |
|---|---|---|---|---|
| 2012/0262407 A1* | 10/2012 | Hinckley | ............... | G06F 3/038 |
| | | | | 345/173 |
| 2013/0093666 A1* | 4/2013 | Nagai | ...................... | G06F 3/01 |
| | | | | 345/156 |
| 2013/0135263 A1* | 5/2013 | Omura | ..................... | G06F 3/03 |
| | | | | 345/179 |
| 2013/0257811 A1 | 10/2013 | Usuda et al. | | |
| 2014/0247209 A1* | 9/2014 | Shimura | .............. | G06F 3/0488 |
| | | | | 345/156 |
| 2015/0029162 A1* | 1/2015 | Harris | ................ | G06F 3/03545 |
| | | | | 345/179 |
| 2015/0035995 A1* | 2/2015 | Uchiyama | ............ | H04N 9/3179 |
| | | | | 348/189 |
| 2015/0370350 A1* | 12/2015 | Hunt | .................. | G06F 3/03545 |
| | | | | 345/173 |

FOREIGN PATENT DOCUMENTS

| | | |
|---|---|---|
| JP | 2013-152739 A | 8/2013 |
| JP | 5454722 B | 3/2014 |

\* cited by examiner

| OPERATION MODE | INDICATOR 1 | INDICATOR 2 | ... |
|---|---|---|---|
| OPERATION MODE 1 | DRAWING (PEN OPERATION) ONLY | DRAWING (PEN OPERATION / PALETTE OPERATION) / PC OUTPUT | ... |
| OPERATION MODE 2 | DRAWING (PEN OPERATION / PALETTE OPERATION) / PC OUTPUT | DRAWING (PEN OPERATION / PALETTE OPERATION) / PC OUTPUT | ... |
| OPERATION MODE 3 | DRAWING (PEN OPERATION) ONLY | DRAWING (PALETTE OPERATION) ONLY | ... |
| ... | ... | ... | ... |

FIG. 5

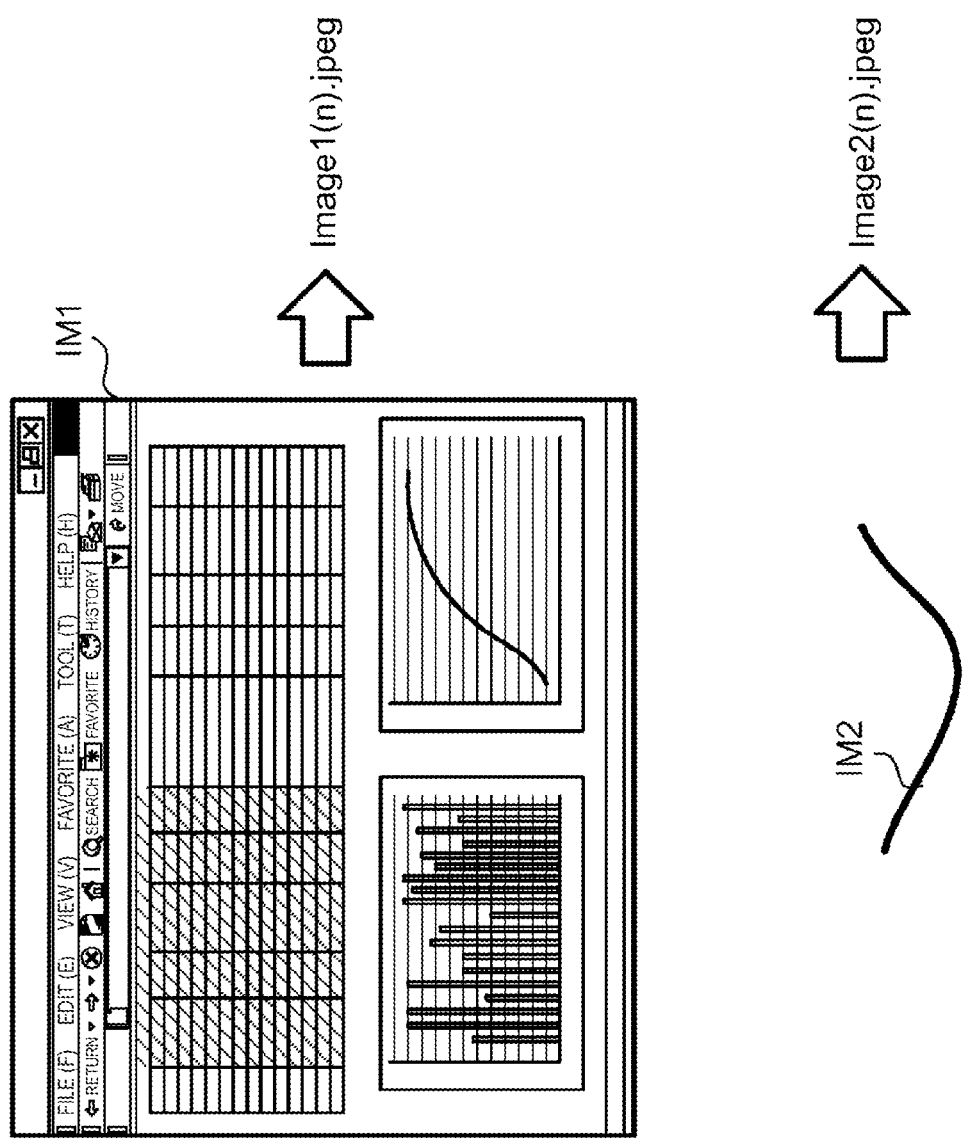

DISPLAY DEVICE, DISPLAY CONTROL METHOD AND DISPLAY SYSTEM FOR DETECTING A FIRST INDICATOR AND A SECOND INDICATOR

The entire disclosure of Japanese Patent Application No. 2014-234266, filed Nov. 19, 2014 and Japanese Patent Application No. 2015-031434, filed Feb. 20, 2015 are expressly incorporated by reference herein.

BACKGROUND

1. Technical Field

The present invention relates to a display device, a display control method and a display system.

2. Related Art

There is a display device having the function of inputting various instructions to a display area, using an indicator such as an electronic pen or user's finger (see JP-A-2011-143557). With this function, various operations to an application such as scrolling up and down an application window, in addition to drawing an image object (so-called annotation) on a background image, can be carries out in a distant place from the computer controlling the display device. For example, the user can highlight a site which should draw the attention of the audience, by drawing an annotation on top of the currently displayed screen (background image) in the state where a document preparation application or an application to prepare presentation slides is being executed.

Here, diversifying input contents by simultaneous use of a plurality of such indicators is proposed (JP-A-2011-143557).

However, in the case where the indicators have different functions from each other and the user uses these functions simultaneously, operation contents may become complicated, inducing operation errors. The technique disclosed in JP-A-2011-143557 does not take into account the aspect of preventing operation errors due to the diversification of input contents or improving certainty of operations in the case of using a plurality of indicators.

SUMMARY

An advantage of some aspects of the invention is that operability is improved while diversification of input contents is secured.

An aspect of the invention provides a display device including: an acquisition unit which acquires a first image from an image supply device; a detection unit which detects an indicator and specifies a position of the indicator and whether the indicator is a first indicator or a second indicator; a generation unit which generates a second image based on the position of the indicator and generates a third image by superimposing the second image on the first image; a display unit which displays the third image; a designation unit which designates either the generation unit or the image supply device as a supply destination of information indicating a position of the second indicator; and a control unit which supplies the information indicating the position of the indicator to the generation unit if the indicator detected by the detection unit is the first indicator, and supplies the information indicating the position of the indicator to the designated supply destination if the indicator detected by the detection unit is the second indicator.

According to this display device, by using one indicator, the user can eliminate the possibility that an operation unintended by the user other than a drawing operation is inputted, and by using the other indicator, the user can input various operations other than drawing. That is, both of the prevention of operation errors and the diversification of input functions can be achieved.

The supply destination of the information indicating the position of the second indicator may be designated by designating a position on a display surface, using the second indicator.

According to this display device, the supply destination of information can be switched easily.

In the case where the generation unit is designated as the supply destination of the information indicating the position of the second indicator, if the position of the second indicator specified by the detection unit is inside a predetermined area on a display surface, the control unit may supply the information indicating the position to the generation unit, and the generation unit may decide an attribute of the second image on the basis of the information supplied.

According to this display device, the drawing attribute can be changed without disturbing an input operation with the first indicator.

The generation unit may display an image object for designating the attribute and execute at least one of change in position or size of the image object, erasure thereof, and re-display of the erased image object, on the basis of the specified position of the second indicator.

According to this display device, the user can be led to quickly and easily understand whether each indicator is currently set as an indicator for drawing only or as an indicator for drawing and other operations as well.

The generation unit may display an image object indicating the position of at least one of the first indicator and the second indicator, which differs according to the designated supply destination.

According to this display device, the user can be led to quickly and easily understand whether each indicator is currently set as an indicator for drawing only or as an indicator for drawing and other operations as well.

The generation unit may display an image object indicating the supply destination designated by the designation unit for a predetermined period if the supply destination is changed by the designation unit.

According to this display device, when it is notified that there is a change as to whether each indicator is currently set as an indicator for drawing only or as an indicator for drawing and other operations as well, the risk of trouble in subsequent operations and screen visibility can be reduced.

The display device may have a first operation mode in which the supply destination of the information indicating the position of the first indicator is fixed, and a second operation mode in which either the image supply device or the generation unit is designated by the designation unit as the supply destination of the information. The control unit may supply the information indicating the position of the first indicator to the generation unit if the device is operating in the first operation mode, and the control unit may supply the information indicating the position of the first indicator to the supply destination designated to the first indicator if the device is operating in the second operation mode.

According to this display device, the diversity of input forms using the indicators is increased further, by switching to the second operation mode so that both of the two indicators are made to function independently as indicators for drawing and other operations as well.

If the generation unit is designated by the designation unit both as the supply destination of the information indicating the position of the first indicator and as the supply destination of the information indicating the position of the second indicator, the generation unit may generate the third image including a first image object and a second image object, designate an attribute of a second image generated on the basis of the position of the first indicator, based on the position within the first image object designated by the first indicator, and designate an attribute of a second image generated on the basis of the position of the second indicator, based on the position within the second image object designated by the second indicator.

According to this display device, in the case of drawing with simultaneous use of the two indicators, operations to change the attributes of the individual images become easier.

In another preferred embodiment, the control unit may transmit data expressing the second image currently displayed by the display unit to the image supply device when a predetermined operation using the second indicator is accepted.

According to this display device, image data generated in the display device can be utilized later in the image supply device.

The first indicator and the second indicator may be colored in different colors from each other. The detection unit may specify whether the indicator is the first indicator or the second indicator on the basis of the color of the indicator.

According to this display device, diverse inputs can be made using the two indicators that can be easily identified.

The indicator may be in a shape having a first end and a second end. The detection unit may specify the first end as the first indicator and specify the second end as the second indicator.

According to this display device, diverse inputs can be made using the single indicator.

Another aspect of the invention provides a display control method including: acquiring a first image from an image supply device; detecting an indicator and specifying a position of the indicator and whether the indicator is a first indicator or a second indicator; generating a second image based on the specified position and generating a third image by superimposing the second image on the first image; designating either an own device or the image supply device as a supply destination of information indicating a position of the second indicator; and supplying the information indicating the position of the indicator to the device which generates the third image if the detected indicator is the first indicator, and supplying the information indicating the position of the indicator to the designated supply destination if the detected indicator is the second indicator.

According to this display control method, by using one indicator, the user can eliminate the possibility that an operation unintended by the user other than a drawing operation is inputted, and by using the other indicator, the user can input various operations other than drawing. That is, both of the prevention of operation errors and the diversification of input functions can be achieved.

Still another aspect of the invention provides a display system including: an image supply unit; an acquisition unit which acquires a first image from the image supply unit; a detection unit which detects an indicator and specifies a position of the indicator and whether the indicator is a first indicator or a second indicator; a generation unit which generates a second image based on the position of the indicator and generates a third image by superimposing the second image on the first image; a display unit which displays the third image; a designation unit which designates either the generation unit or the image supply unit as a supply destination of information indicating a position of the second indicator; and a control unit which supplies the information indicating the position of the indicator to the generation unit if the indicator detected by the detection unit is the first indicator, and supplies the information indicating the position of the indicator to the designated supply destination if the indicator detected by the detection unit is the second indicator.

According to this display system, by using one indicator, the user can eliminate the possibility that an operation unintended by the user other than a drawing operation is inputted, and by using the other indicator, the user can input various operations other than drawing. That is, both of the prevention of operation errors and the diversification of input functions can be achieved.

According to the aspects of the invention, operability is improved while diversity of input contents is secured.

BRIEF DESCRIPTION OF THE DRAWINGS

The invention will be described with reference to the accompanying drawings, wherein like numbers reference like elements.

FIG. 5 conceptually shows setting contents of operation modes.
FIG. 9 conceptually shows image saving processing.

DESCRIPTION OF EXEMPLARY EMBODIMENTS

Figure 1:
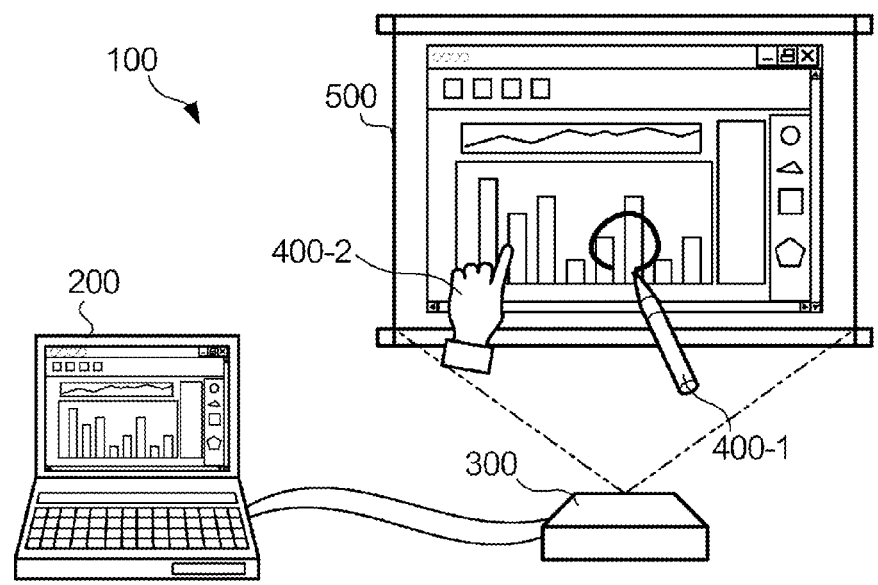
FIG. 1 shows an outline of a display system 100.

FIG. 1 shows an outline of a display system 100. The display system 100 includes a PC 200, a projector 300, a plurality of indicators 400 (indicator 400-1 and indicator 400-2), and a display surface 500. The PC 200 is equivalent to the image supply device according to the invention and is a typical personal computer capable of executing a document preparation application, an image viewer application and the like. The PC 200 supplies data of an image that should be displayed on the display surface 500 (for example, a screen of an application being executed on the PC 200) to the projector 300 connected to the PC 200. The projector 300 is an example of a display device. The projector 300 has functions of a typical projector and projects an image based on image data supplied from the PC 200, on the display surface 500. The display surface 500 is a dedicated screen or a wall surface.

The indicators 400 are input devices such as an electronic pen held by a user, or the user's own hand or finger. The two indicators 400-1 and 400-2 may be used by one user or may be used by two users. Both of the indicators 400-1 and 400-2 may be pens or may be fingers. The number of the indicators 400 is arbitrary. FIG. 1 shows an example where the indicator 400-2 is a user's finger whereas the indicator 400-1 is an electronic pen used by the user.

By designating a position within the display surface 500 using each indicator 400, the user can draw an image object on top of an image based on image data supplied from the PC 200 or cause an application program operating on the PC 200 to realize an operation corresponding to the position, on the display surface 500. For example, in the case where a document viewer application is started up on the PC 200 and where a window related to the application is displayed, drawing a line or graphic pattern (annotation) or the like can be drawn on top of the screen, enlarging or reducing the screen, scrolling up and down the window, starting up other applications and switching between the applications, and the like, can be carried out by operating the indicators 400.

Figure 2:
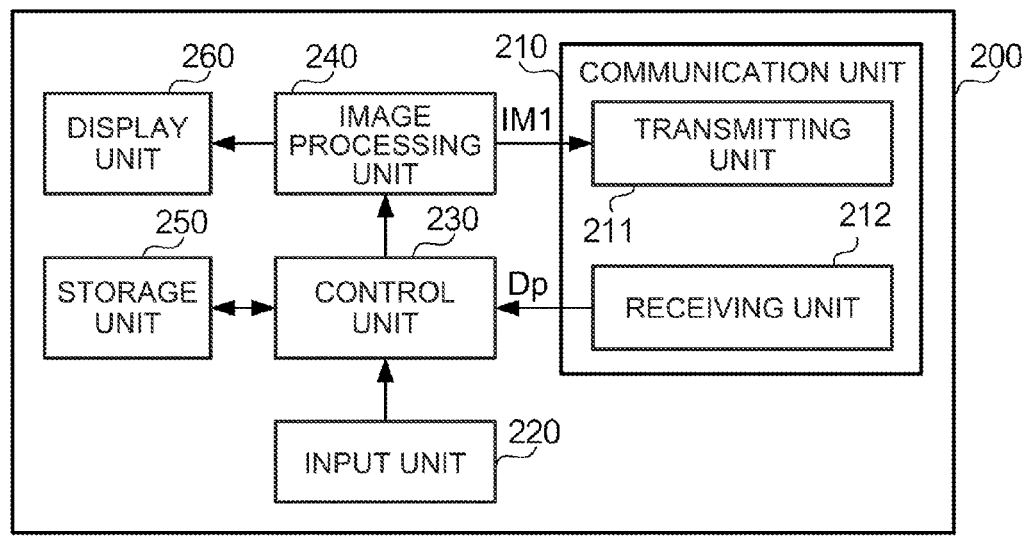
FIG. 2 shows functions of a PC 200.

FIG. 2 shows functions of the PC 200. The PC 200 includes a communication unit 210, an image processing unit 240, a control unit 230, a display unit 260, a storage unit 250, and an input unit 220.

The communication unit 210 is a communication interface and includes a transmitting unit 211 and a receiving unit 212. The receiving unit 212 receives operation information Dp from the projector 300 and supplies the operation information Dp to the control unit 230. The transmitting unit 211 transmits a first image IM1 supplied from the image processing unit 240, to the projector 300.

The control unit 230 is realized by a processor such as a CPU (central processing unit) and executes various application programs such as a document preparation application and an image viewer application. Also, when operation information Dp is received from the receiving unit 212, the control unit 230 transfers coordinates included in the operation information Dp to the application program in question. Based on the coordinates, an operation (switching pages, enlargement and reduction, scrolling up and down the screen, or the like) prescribed to the application program is specified. If the specified operation involves update of the screen, the control unit 230 outputs a command to update the screen to the image processing unit 240.

The image processing unit 240 is realized by an image processor or the like and generates a first image IM1 that is an image showing the result of execution of the application or the like. The generated first image IM1 is supplied to the display unit 260 and the transmitting unit 211. The display unit 260 is a display device such as a liquid crystal display and displays an image based on the first image IM1. The input unit 220 is an input device such as a keyboard and mouse and inputs user instructions and commands to the control unit 230. The storage unit 250 is a storage device such as a hard disk or semiconductor memory and stores the OS (Operating System) and application programs executed by the control unit 230 and image data or the like supplied from the projector 300.

Figure 3:
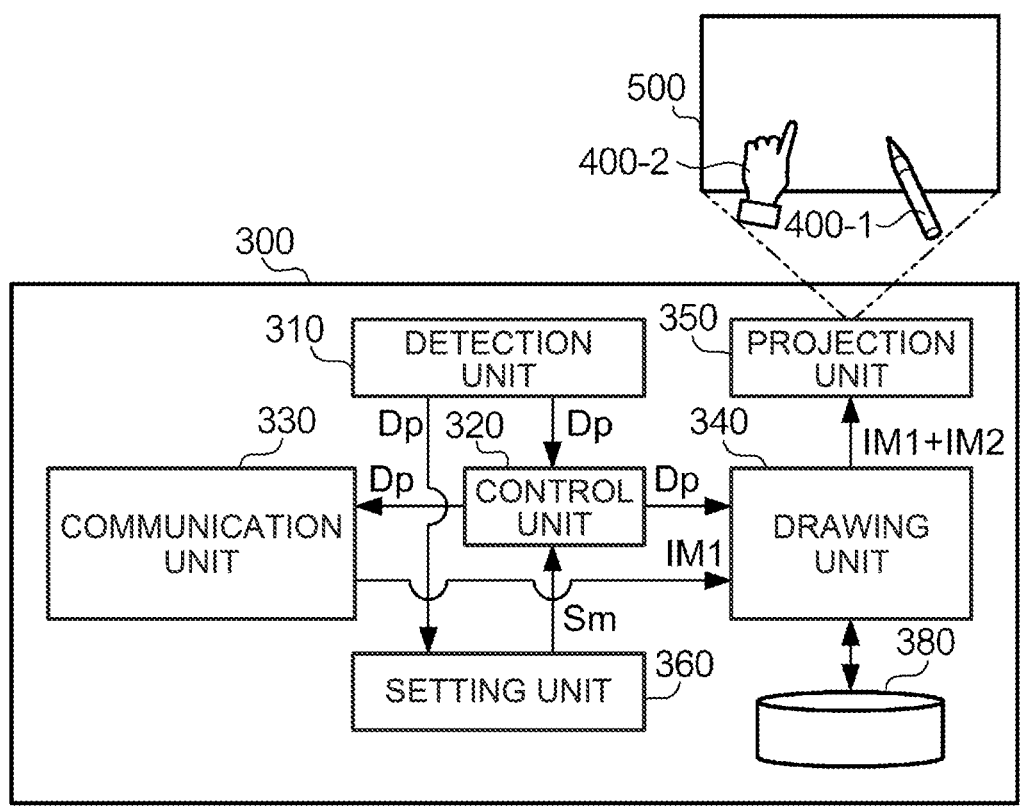
FIG. 3 shows functions of a projector 300.

FIG. 3 shows functions of the projector 300. The projector 300 has functions of a typical projector. That is, the projector 300 projects an image based on a first image IM1 supplied from the PC 200, on the display surface 500.

Specifically, the projector 300 includes a detection unit 310, a control unit 320, a communication unit 330 (an acquisition unit), a drawing unit 340, a projection unit 350, and a storage unit 380. The communication unit 330 acquires a first image IM1 supplied from the PC 200.

The detection unit 310 detects that an indicator 400 has designated a position on the display surface 500. Then, the detection unit 310 calculates the coordinates of the position and discriminates (specifies) whether the indicator that has designated the position is the indicator 400-1 or the indicator 400-2.

For specifying the position of the indicator, a method can be employed in which a light source and a photosensor are provided in the detection unit 310 so as to cast visible rays or infrared rays toward the display surface 500 and then receive and analyze the reflected light, thereby specifying the presence of the indicator 400-1 and the indicator 400-2 and the positions pointed to by the indicators. The "position of the indicator" refers to the position pointed to by the indicator on the display surface.

Alternatively, if one indicator 400 is a device having a wireless transmission function, radio waves from the indicator 400 maybe received and the position of this indicator 400 within the display surface 500 may be decided on the basis of the intensity of reception or the like.

Alternatively, a light emitting mechanism such as an LED (light emitting diode) maybe provided in each indicator 400 and a camera may be provided in the detection unit 310 so as to pick up images of the display surface 500 intermittently and then analyze the acquired images successively, thereby specifying the position of each indicator.

As a method for discriminating each indicator, specifying the shape of the indicator 400 on the basis of characteristics of the received reflected light may be employed. Alternatively, if indicators 400 of the same shape need to be discriminated from each other, the discrimination can be made, for example, by providing each indicator 400 with the function of wirelessly transmitting an unique ID (identification) thereof and causing the detection unit 310 to receive the ID. In this case, if the presence and position of the indicator can be confirmed but the unique ID cannot be received, the indicator is determined as a finger. Alternatively, the respective indicators 400 may be made to emit light with different wavelengths from each other and each indicator 400 may be discriminated on the basis of the wavelength of the received light. Also, the respective indicators 400 may be made to emit light in different patterns from each other and each indicator 400 may be discriminated on the basis of the light emission pattern of the received light.

The detection unit 310 generates operation information Dp including an identifier of the discriminated indicator, calculated coordinates, and an event content. The identifier is allocated uniquely to each indicator 400. Based on the identifier, whether the indicator 400 is the indicator 400-1 or the indicator 400-2 can be specified. The coordinates are the coordinates of the designated position within the display surface 500. The event content is the information indicating the operation content and the state of the indicator other than the coordinate values, such as whether a designation is made or not (where the display surface is touched or not), or whether a designation is canceled or not (whether the finger is moved away from the display surface or not), which is determined on the basis of the timing of detection. The generated operation information Dp is successively supplied to the control unit 320 and a setting unit 360.

The setting unit 360 includes the designation unit according to the invention and is realized by a processor. The setting unit 360 sets the input function of at least one of the indicator 400-1 and the indicator 400-2. Specifically, whether the indicator 400 should be made to function as a device to input an instruction related to the drawing of a second image IM2 in the projector 300 (indication of the position where the image is to be drawn, and designation of attributes of the image (indication of color, thickness, line type, and drawing method; the same applies to the description below) (called a drawing mode), and whether the indicator 400 should be made to function as a device to input an instruction to be processed by the PC 200 (called a mouse mode), are provided. In other words, the setting unit 360 designates one of the drawing unit 340 (drawing mode) and the control unit 320 (mouse mode), as the transfer destination of the operation information Dp about each indicator 400. There may be an indicator 400 to which neither the mouse mode nor the drawing mode is set. In this case, a predetermined mode is given.

Specifically, the setting unit 360 generates an operation signal Sm based on the operation information Dp supplied from the detection unit 310 and outputs the operation signal Sm to the control unit 320.

If the drawing unit 340 is designated by the setting unit 360 as the transfer destination of the operation information Dp, a command to output the operation information Dp to the drawing unit 340 is described in the operation signal Sm. Meanwhile, if the PC 200 is designated as the transfer destination of the operation information Dp, a command to output the operation information Dp to the communication unit 330 is described in the operation signal Sm. As an example of the setting by the setting unit 360, the control unit 320 is controlled to output the operation information Dp constantly to the drawing unit 340 if it is detected that the indicator 400-1 is used to carry out the input, on the basis of the identifier of the operation information Dp, and to output the operation information Dp to the communication unit 330 if the indicator 400-2 is used to carry out the input.

The control unit 320 is realized by a selection circuit and outputs the operation information Dp received from the detection unit 310, to the supply destination designated by the operation signal Sm.

The designation and change of the drawing mode or mouse mode by the setting unit 360 are carried out as the user designates a predetermined position on the display surface 500 using the indicator 400 at a desired timing.

The drawing unit 340 is realized by a drawing processor and generates a second image IM2 based on the operation information Dp. The drawing unit 340 also combines the first image IM1 supplied from the communication unit 330 with the generated second image IM2 and thus generates a combined image (an example of a third image). Moreover, the drawing unit 340 generates an image for prescribing the input content of the indicator 400 such as an image object for designating and changing attributes of the image using the indicator 400 (hereinafter referred to as a tool palette) or an image indicating the present position of the indicator, and combines this image with the first image IM1 and the second image IM2, thus generating a combined image. That is, the drawing unit 340 is an example of a generation unit which generates a combined image.

An image signal expressing the combined image is outputted to the projection unit 350. Also, if a predetermined operation is carried out using the indicator 400, the drawing unit 340 outputs the first image IM1 and the second image IM2 to the PC 200.

The projection unit 350 is realized by a projection mechanism including a light source (laser or the like), lens, mirror and prism, a modulation mechanism which includes optical elements such as liquid crystal panels corresponding to respective colors and modulates light from the light source on the basis of an image signal, and an optical system which guides the modulated light to the projection mechanism. The projection unit 350 projects the combined image generated by the drawing unit 340, on the display surface 500. That is, the projection unit 350 is an example of a display unit which displays a combined image.

The storage unit 380 is a storage device such as a semiconductor memory or hard disk and stores a program which is executed by the drawing unit 340 so as to realize operations related to combined display of the first image IM1 and the second image IM2, described below.

Figure 4:
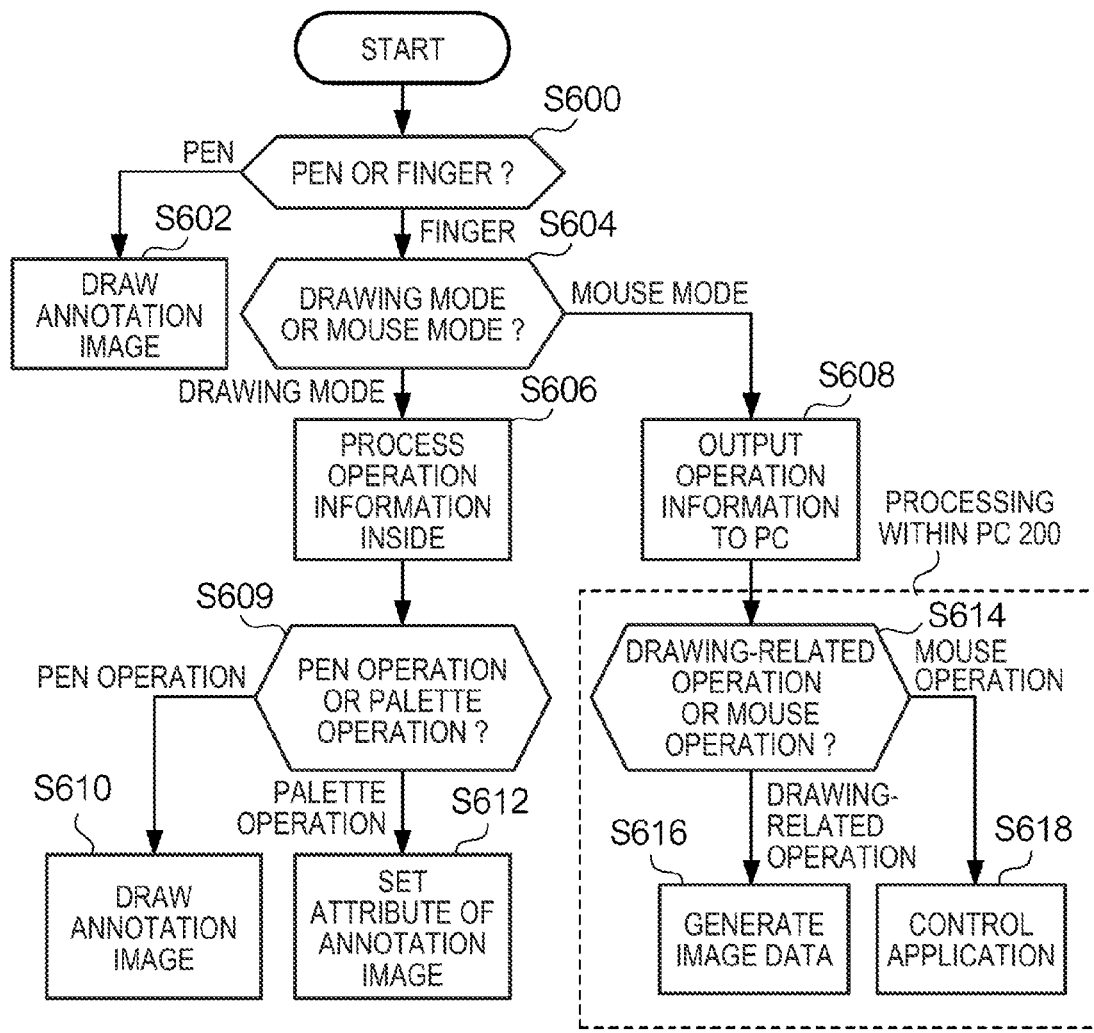
FIG. 4 shows an example of operation of the projector 300 (Part 1).

FIG. 4 shows an example of the operation carried out in relation to the indicator 400 in the projector 300 (Part 1). It is assumed that the mouse mode or drawing mode is set in advance by a predetermined method. In the description below, an expression that the drawing unit 340 displays an image on the display surface 500 may be used, and this means that the drawing unit 340 generates the image and that the projection unit 350 projects this image on the display surface 500.

When an indicator 400 is detected, the detection unit 310 determines whether the indicator is the indicator 400-1 (here, an electronic pen) or the indicator 400-2 (herein, a finger) (S600). If it is determined that the indicator is the indicator 400-1 (that is, an operation with a pen is carried out), the drawing unit 340 draws a second image (annotation image) IM2 based on the operation information Dp supplied from the control unit 320 (S602). Meanwhile, if it is determined that the indicator is the indicator 400-2 (that is, position designation is carried out with a finger), the setting unit 360 determines whether the currently set mode is the mouse mode or drawing mode (S604). If the drawing mode is set, it is decided that processing is to be carried out inside the projector 300 (S606). Subsequently, whether the operation is an operation for designating the position of a dot or line (called a pen operation) or an operation for designating attributes of the image to be drawn (hereinafter called a palette operation), is determined (S609).

The determination on whether the operation with each indicator 400 is a pen operation or palette operation is carried out by the following method. The drawing unit 340 displays two image objects corresponding to a pen operation and a palette operation on the display surface 500. If one object is touched, it is determined that all the subsequent inputs are pen operations, whereas if the other object, it is determined that all the subsequent inputs are palette operations.

Alternatively, instead of the user designating a pen operation or palette operation in advance, whether the detected operation is a pen operation or palette operation may be automatically determined on the basis of the operation information Dp. For example, if the designated position is within a predetermined area in the display surface 500, the operation is determined as a palette operation, whereas if the designated position in other areas, the operation is determined as a pen operation.

In the case of a pen operation, the drawing unit 340 executes drawing based on the coordinates at the position that the indicator 400 pointed (S610). In the case of a palette operation, the drawing unit 340 changes the currently set attribute related to the drawing of the image, to the attribute of the image allocated to the designated position (S612).

Meanwhile, if the mouse mode is set in S604, the operation information Dp is outputted to the PC 200 (S608). As the PC 200 receives the operation information Dp, the control unit 230 analyzes the operation content based on the operation information Dp and determines whether the operation is an operation related to the drawing of a first image IM1 or a mouse operation such as window control (S614). Depending on the result of the determination, the generation of a first image IM1 by the image processing unit 240 (S616) or application control by the control unit 230 (S618) is carried out.

According to the above example, in the case of carrying out the drawing of a second image IM2 and various operations other than the drawing of a second image IM2 using two indicators which designate positions within the display surface, one indicator functions as a pen and the other indicator functions as an indicator either for drawing or for various operations (for drawing and other operations as well). By using one indicator, the user can eliminate the possibility that an operation unintended by the user other than a drawing operation is inputted (for example, the screen is scrolled up or down while the user wants to draw a line), and by using the other indicator, the user can input various operations other than drawing. That is, according to the example, both of the prevention of operation errors and the diversification of input functions can be achieved.

If the user properly set the drawing mode or mouse mode, the other indicator can switch between the operation related to drawing (that is, input of a drawing content such as a line drawing or designation of attributes of an image) and the mouse operation. If the drawing mode is designated, it is also possible to cause both of the two indicators to function as pens, or to cause one indicator to function as a pen and the other indicator as a device for palette operation. In this case, the user can achieve complex drawing expressions with a small amount of operation (operation time), by using the two indicators simultaneously.

Meanwhile, if the mouse mode is designated, it is possible to carry out a pen operation with one indicator and carry out an operation such as enlargement and reduction of the screen or switching between screens, with the other indicator. The drawing operation and the mouse operation can be carried out always in parallel, without having to switching between functions each time. Specifically, the user can draw with a pen held in the right hand and scroll up and down the application screen with a finger of the left hand.

Other Examples

In the example, the indicator 400-2 can be made to achieve a plurality of functions by designating the drawing mode or mouse mode, whereas the function of the indicator 400-1 is fixed. However, the function of the indicator 400-1 can be variably set as well. In other words, the user maybe allowed to change a combination of functions provided for the indicator 400-1 and the indicator 400-2. Specifically, a plurality of operation modes defined as combinations of functions provided for (or limited to) the receptive indicators 400 is defined, and the setting unit 360 selectively applies one of these operation modes in response to an instruction by the user.

FIG. 5 conceptually shows an example of setting contents of operation modes. An operation mode 1 is a setting in which the indicator 400-1 is allowed to perform operations in the drawing mode (pen operation or palette operation) only, whereas the indicator 400-2 is allowed to perform any of pen operation, palette operation, and PC output. This mode is effective in the case where both of the diversity of input contents and the prevention of operation errors are to be achieved.

An operation mode 2 is a mode in which both of the indicator 400-1 and the indicator 400-2 can function as a pen or palette operation device in the drawing mode and for PC output (mouse mode). In other words, in the operation mode 2, the two indicators, each of which can operate in the drawing mode and in the mouse mode, operate independently. In this operation mode, complex contents can be inputted within a short time by using the two indicators simultaneously at the time of drawing. Also, the way of using the two indicators can be adjusted to the user's preference and circumstances or the like.

An operation mode 3 is a mode in which the indicator 400-1 functions as a device for pen operation in the drawing mode only, whereas the indicator 400-2 functions as a device for palette operation in the drawing mode only. In this mode, each indicator functions in the drawing mode. That is, all the inputted position information is limited to information related to the drawing of a second image IM2. Therefore, unless the operation mode is switched, inputting an operation that is not related to drawing, such as operation of an application, is prohibited.

In this operation mode, it is conceivable that, for example, the user carries out a pen operation with the dominant hand and uses a finger of the other hand to carry out an operation to change an attribute of the image. In this case, since the division of roles by each hand for operation is clarified, each operation is easier to understand. Therefore, it can be said that this operation mode is suitable where the user is unfamiliar with operations or where the user wants to concentrate on a drawing operation regardless of the degree of familiarity.

Of the examples of operation, the operation mode 1 and the operation mode 3 are equivalent to the first operation mode according to the invention, in which the supply destination of the operation information Dp related to the indicator 400-1 is fixed. The operation mode 2 is equivalent to the second operation mode according to the invention, in which the operation information Dp related to the indicator 400-1 is supplied to a designated supply destination.

Figure 6:
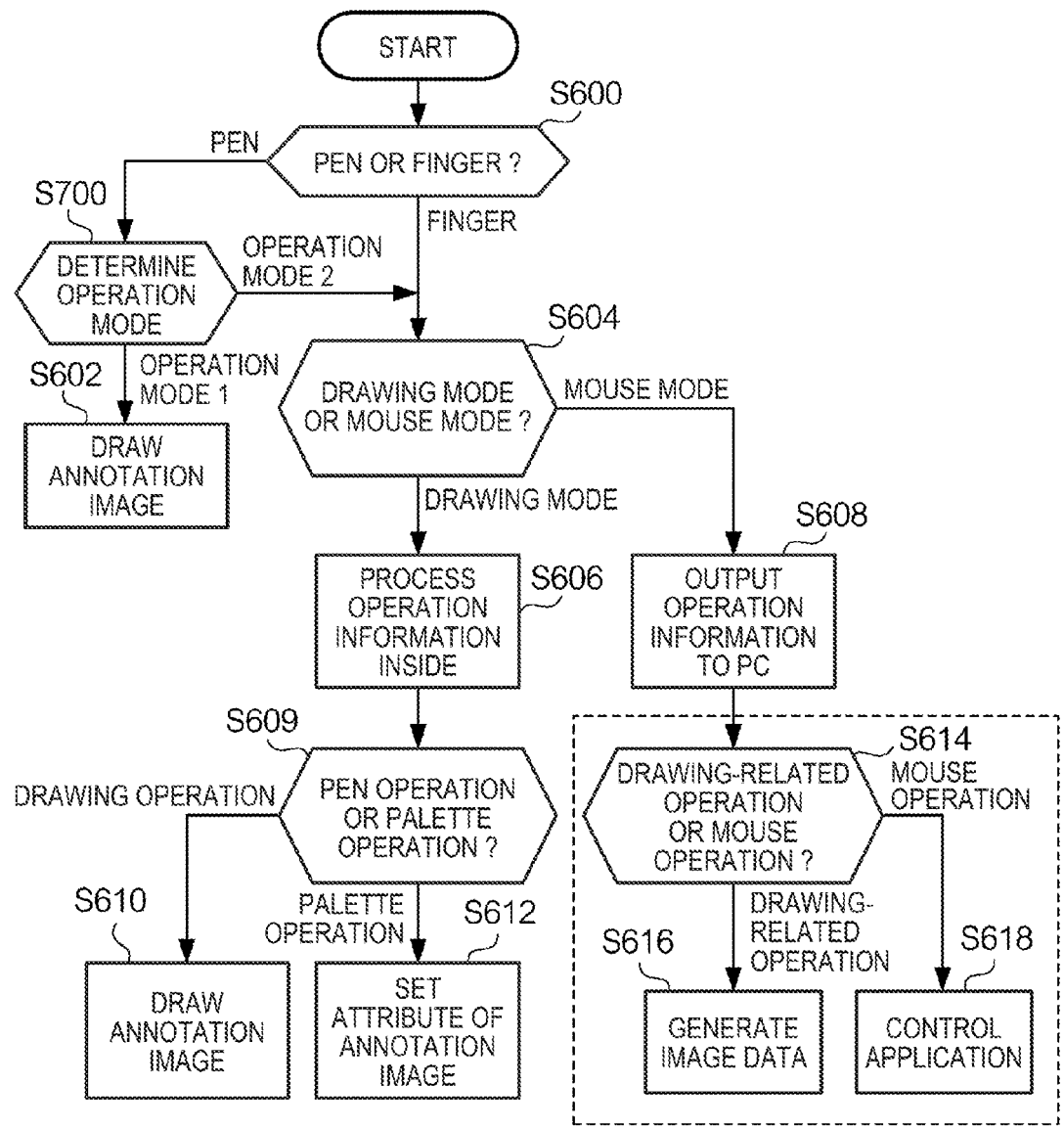
FIG. 6 shows an example of operation of the projector 300 (Part 2).

FIG. 6 shows an example of operation of the projector 300 in the case where the setting unit 360 introduces an operation mode. It is assumed that, as this operation mode, the above operation mode 1 and operation mode 2 are prepared and that one of these operation modes is set according to the designation by the user or automatically by the projector 300.

The example of operation shown in FIG. 6 is different from the example of operation in FIG. 4 in that the functions provided for the indicators can vary, depending on the operations mode as well as the indicators and the drawing mode/mouse mode. Specifically, the indicator is discriminated (S600), and if the indicator is a finger, the same processing as in the example of FIG. 4 is carried out. However, if the indicator is a pen, the operation mode is determined (S700). If the operation mode 1 is set, the indicator functions as an indicator for pen operation only (S602), as in the case of FIG. 4. Meanwhile, if the operation mode 2 is set, which of the drawing mode and the mouse mode is set is determined (S604), and the indicator functions as an indicator for pen operation (drawing of annotation image), setting attributes of the image, and PC output (generation of image data or application control) according to the result of the determination, as in the example of FIG. 4. That is, the two indicators, each of which can carry out the drawing operation and the mouse operation, operate independently.

By operating the indicator 400 to an image object displayed on the display surface 500 in order to designate an attribute of the image, at least one of change in the position or size of the image object, erasure of the image object, and re-display of the erased image object, may be executed.

Figure 7A:
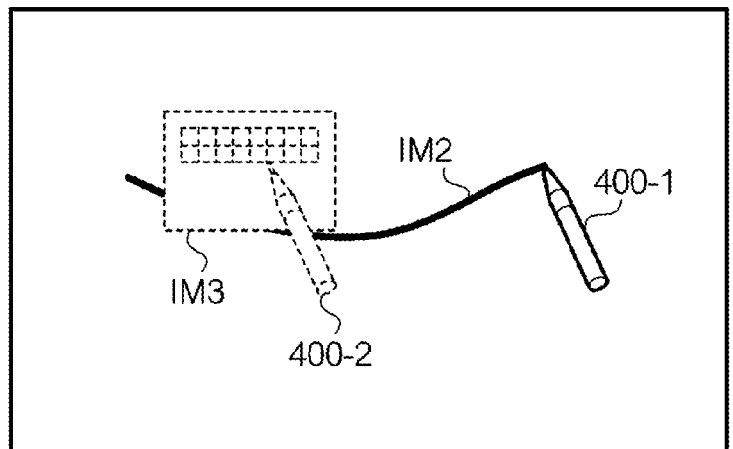
FIGS. 7A and 7B show an example of a display surface 500.
Figure 7B:
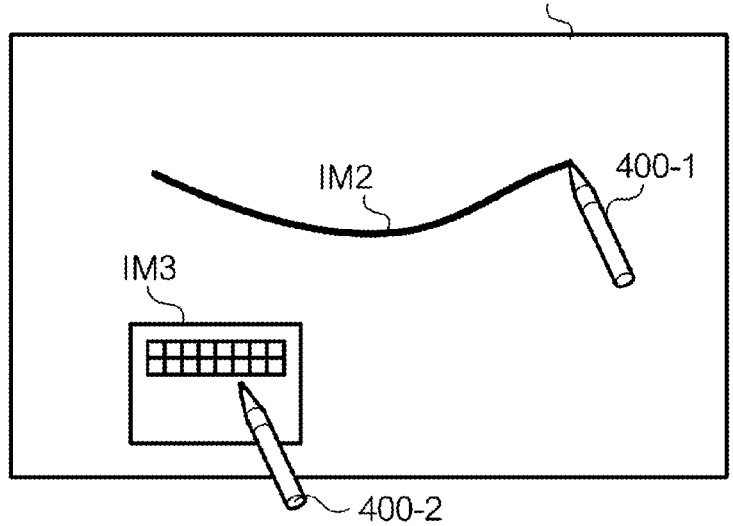

The change in the arrangement of the image object will be described specifically, referring to FIGS. 7A and 7B. In the example shown in FIGS. 7A and 7B, it is assumed that both of the indicator 400-1 and the indicator 400-2 are electronic pens. It is now assumed that the operation mode 3 is set and that the indicator 400-1 is functioning as an indicator for pen operation only, whereas the indicator 400-2 is functioning as an indicator for palette operation only. As shown in FIG. 7A, the user draws a second image IM2, using the indicator 400-1, and also changes an attribute of the image by designating a predetermined position within an operation panel IM3 with the other hand (or switching the indicator 400-1 to the indicator 400-2 in the same hand). Also, using the indicator 400-2, the user carries out a predetermined operation (for example, dragging) on the operation panel IM3, thereby changing the position of the operation panel IM3. As a result of the drag operation in the state shown in FIG. 7A, the position of the operation panel IM3 is changed as shown in FIG. 7B. As a result of the change in the arrangement, the part of the second image IM2 previously hidden behind the operation panel IM3 is now visible.

Since the user can thus change the arrangement of an image object for changing attributes of an image, impediment to the visibility of the content that is already drawn and obstruction to the operation of the indicator 400 used for drawing can be eliminated.

The image object for changing attributes of an image may be provided in a number corresponding to the number of the indicators.

Figure 8:
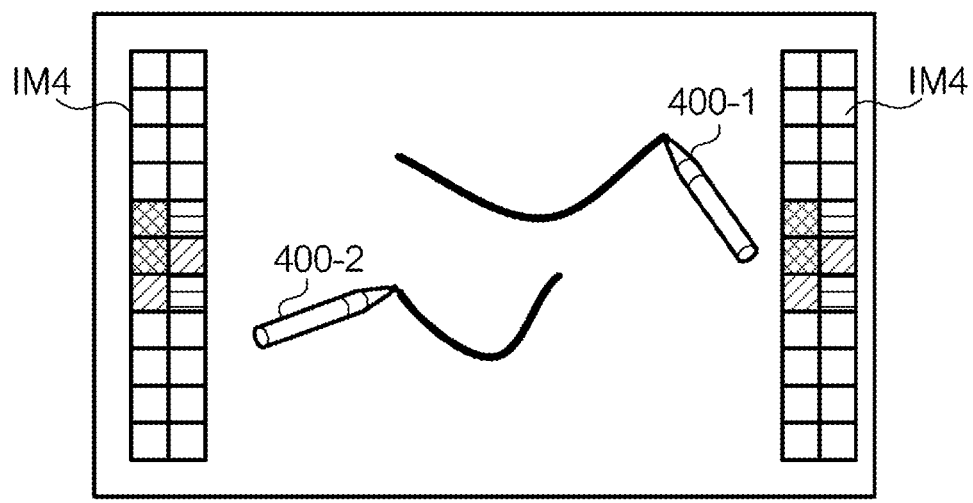
FIG. 8 shows an example of the display surface 500 (Part 2).

FIG. 8 shows an example in which a tool palette IM4 is displayed at the left and right ends of the display surface 500. As the tool palette IM4 on the right-hand side is designated by the indicator 400-1, an attribute of an image drawn with the use of the indicator 400-1 is changed. If this tool palette IM4 is designated by the indicator 400-2, the designation is not processed as designating an attribute of an image drawn with the use of the indicator 400-1 and therefore is processed as a pen operation with the indicator 400-2 or determined as invalid designation. Similarly, as the tool palette IM4 on the left-hand side is designated by the indicator 400-2, an attribute of an image drawn with the use of the indicator 400-2 is changed. If this tool palette IM4 is designated by the indicator 400-1, the designation is not processed as designating an attribute of an image drawn with the use of the indicator 400-2 and therefore is processed as a pen operation with the indicator 400-1 or determined as invalid designation.

In this way, as the dedicated tool palettes corresponding to the respective indicators 400 are provided, the user can avoid getting confused at the time of using a plurality of indicators 400 simultaneously.

The first image IM1 and the second image IM2 which are displayed may be saved in the PC 200. Specifically, as the user designates a predetermined position on the operation panel IM3 using the indicator 400, the drawing unit 340 outputs the first image IM1 and the second image IM2 to the PC 200 via the communication unit 330. The PC 200 associates the first image IM1 and the second image IM2 with each other and saves these images as separate image files.

FIG. 9 conceptually shows image saving processing. In the example of FIG. 9, the first image IM1 and the indicator 400-2 are saved as image files "image1 (n).jpeg" and "image2 (n).jpeg", respectively, in the JPEG (Joint Photographic Experts Group) format. According to the related art, the PC 200 cannot grasp the second image IM2 generated in the projector 300. However, this saving processing enables the PC 200 to reproduce the content that is actually displayed on the display surface 500. Moreover, since the first image IM1 and the second image IM2 are saved as separate files, it is easy not only to reproduce the images but also to process the images further. The saved data may be transmitted (outputted) to other devices on emails or the like via a network.

Figure 10A:
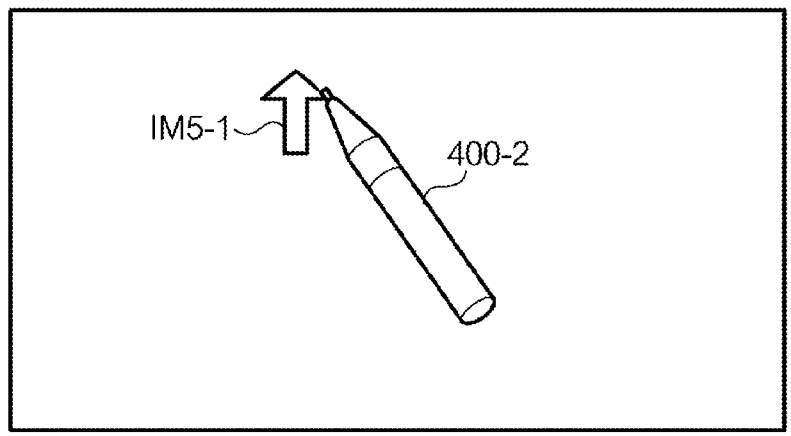
FIGS. 10A and 10B show an example of the display surface 500 (Part 3).
Figure 10B:
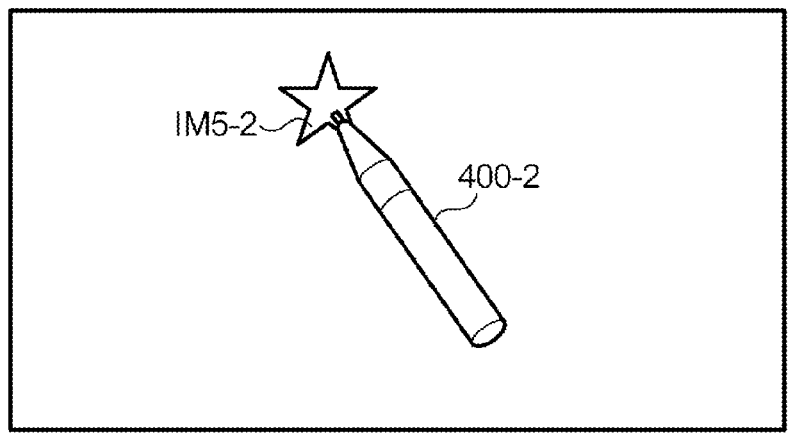

With the use of an image, the user may be notified of the content of the function applied to each indicator or whether it is the operation mode or mouse mode. FIGS. 10A and 10B show an example of the notification. If the drawing mode (in which only pen operation or palette operation is available) is designated for the indicator 400-2 (FIG. 10A), the drawing unit 340 displays a pointer image IM5-1 near the position of the indicator 400-2, on the display surface 500. In the case of the mouse mode (FIG. 10B), the drawing unit 340 displays a point image IM5-2.

Figure 11:
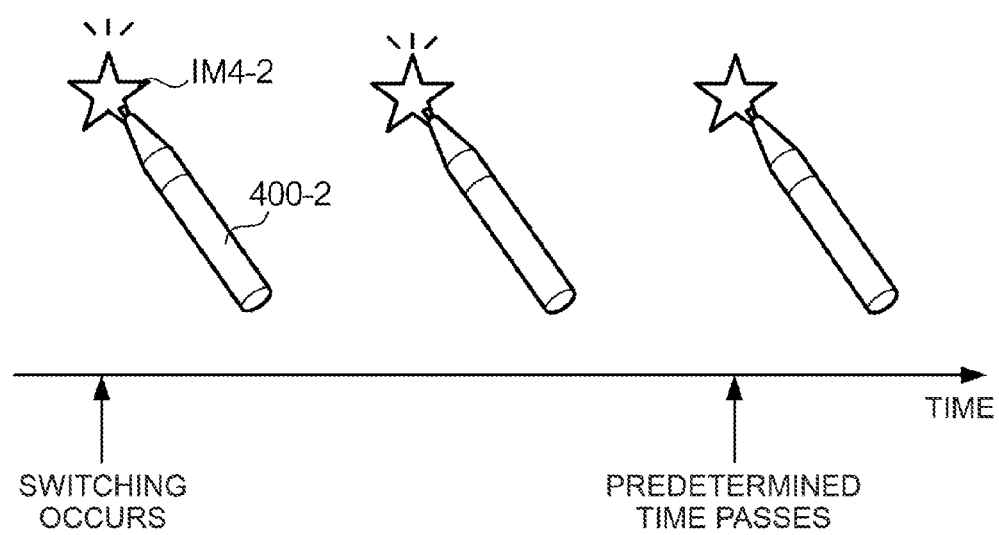
FIG. 11 shows an example of the display surface 500 (Part 4).

Alternatively, with a switching between the operation mode and the mouse mode as a trigger, an image object indicating the mode after the switching may be displayed for a predetermined period. For example, as shown in FIG. 11, if the indicator 400-2 switches from the drawing mode to the mouse mode, the drawing unit 340 flashes the pointer image IM5-2 on and off for a predetermined period.

By thus notifying the user of the information about the function of the indicator 400 with the use of an image, it is possible to let the user quickly and easily understand the function currently provided for each indicator 400 (specifically, whether it is an indicator for drawing only or for drawing and PC output as well). This contributes to prevention of operation errors.

Three or more indicators may be identified. Also, instead of univocally discriminating each indicator, it is possible simply to discriminate an attribute such as the type of the indicator (for example, whether it is an electronic pen or finger, or whether it is a long-type electronic pen or a short-type pen). That is, which of at least two types an indicator belongs to is decided, and the function of this indicator is decided on the basis of the result.

The indicator 400-1 and the indicator 400-2, and the method for the detection unit 310 to discriminate (specify) these indicators, are not limited to those described in the embodiment. For example, both of the indicator 400-1 and the indicator 400-2 may be electronic pens with casings thereof colored in different colors from each other (for example, red and green). The detection unit 310 discriminates whether the indicator is the indicator 400-1 or the indicator 400-2, on the basis of the color of the casing of the indicator.

In another example, one end (first end) of a single indicator may be recognized as the indicator 400-1, while the other end (second end) on the opposite side of the one end of the indicator may be recognized as the indicator 400-2. For example, if the indicator is an electronic pen, the tip of the pen (first end) may be recognized as the indicator 400-1 and the rear end of the pen (second end) may be recognized as the indicator 400-2. In this case, a light emitting element and a button for the light emitting element to emit light are provided on both ends of the indicator. When using the first end, the user designates a position while pressing the button on the first end side. When using the second end, the user turns the electronic pen upside down and designates a position while pressing the button on the second end side. According to this example, for example, if the drawing mode is set to the first end and the mouse mode is set to the second end, the user can switch between the two operation modes by turning the single indicator upside down and vise versa.

The method for using the first end and the second end of a single indicator as the indicator 400-1 and the indicator 400-2, respectively, is not limited to the method in which the timing of light emission is varied, as described above. For example, the wavelength of light emitted from the light emitting elements at the first end and the second end may be different from each other. Alternatively, the light emission patterns (change in intensity of light emission with time) of the light emitting elements at the first end and the second end may be different from each other. In still another example, instead of using light emitting elements, the first end and the second end may be in different shapes or colors from each other, and the first end and second end may be identified on the basis of the shapes or colors thereof.

The generation of the first image IM1 and the application control function in the PC 200 may be integrated into the projector 300. That is, the PC 200 and the projector 300 need not necessarily installed as physically independent hardware units. Moreover, in this case, the projection function of the projector 300 may be omitted and positions on the display unit 260 may be designated using a plurality of indicators 400, so as to display the first image IM1 and the second image IM2 combined together on the display unit 260. That is, the display device according to this embodiment is not limited to a projector and may also be a direct-view display device such as a liquid crystal display or organic EL display.

In short, the display system according to the invention may include: an image supply unit; an acquisition unit which acquires a first image from the image supply unit; a detection unit which detects an indicator and specifies a position of the indicator and whether the indicator is a first indicator or a second indicator; a generation unit which generates a second image based on the specified position and generates a third image made up of the acquired first image and the second image superimposed on each other; a display unit which displays the third image; a designation unit which designates either the generation unit or the image supply unit as a supply destination of information indicating a position of the second indicator; and a control unit which supplies the information indicating the position of the indicator to the generation unit if the detected indicator is the first indicator, and supplies the information indicating the position of the indicator to the designated supply destination if the detected indicator is the second indicator.

What is claimed is:

1. A display device comprising:
a communication interface which acquires a first image from an image supply device;
a detection device which detects an indicator and specifies a position of the indicator and whether the indicator is a first indicator or a second indicator;
at least one processor that executes one or more programs to realize one or more functions of:
a setting unit which sets the second indicator to operate in one of a first operation mode for drawing a second image over the first image based on the position of the indicator, and a second operation mode for performing an operation other than drawing;
a generation unit which generates the second image based on the position of the indicator and generates a third image by superimposing the second image on the first image;
a designation unit which designates either the generation unit or the image supply device as a supply destination of information indicating a position of the second indicator; and
a control unit which supplies the information indicating the position of the indicator to the generation unit if the indicator detected by the detection device is the first indicator, and supplies the information indicating the position of the indicator to the designated supply destination if the indicator detected by the detection device is the second indicator; and
a display unit which displays the third image,
wherein
the image supply device is external to the display device,
when the second indicator is set to the first operation mode, the designation unit designates the generation unit as the supply destination, and
when the second indicator is set to the second operation mode, the designation unit designates the image supply device as the supply destination.

2. The display device according to claim 1, wherein the supply destination of the information indicating the position of the second indicator is designated by designating a position on a display surface, using the second indicator.

3. The display device according to claim 1, wherein in the case where the generation unit is designated as the supply destination of the information indicating the position of the second indicator,
if the position of the second indicator specified by the detection device is inside a predetermined area on a display surface, the control unit supplies the information indicating the position to the generation unit, and
the generation unit decides an attribute of the second image on the basis of the information supplied.

4. The display device according to claim 3, wherein the generation unit displays an image object for designating the attribute and executes at least one of change in position or size of the image object, erasure thereof, and re-display of the erased image object, on the basis of the specified position of the second indicator.

5. The display device according to claim 1, wherein the generation unit displays an image object indicating the position of at least one of the first indicator and the second indicator, which differs according to the designated supply destination.

6. The display device according to claim 1, wherein the generation unit displays an image object indicating the supply destination designated by the designation unit for a predetermined period if the supply destination is changed by the designation unit.

7. The display device according to claim 1, wherein the setting unit sets the first indicator to operate in one of a third operation mode in which the supply destination of the information indicating the position of the first indicator is fixed, and a fourth operation mode in which either the image supply device or the generation unit is designated by the designation unit as the supply destination of the information, and
the control unit supplies the information indicating the position of the first indicator to the generation unit if the first indicator is set to the third operation mode, and the control unit supplies the information indicating the position of the first indicator to the supply destination designated to the first indicator if the first indicator is set to the fourth operation mode.

8. The display device according to claim 7, wherein if the generation unit is designated by the designation unit both as the supply destination of the information indicating the position of the first indicator and as the supply destination of the information indicating the position of the second indicator, the generation unit generates the third image including a first image object and a second image object, designates an attribute of a second image generated on the basis of the position of the first indicator, based on the position within the first image object designated by the first indicator, and designates an attribute of a second image generated on the basis of the position of the second indicator, based on the position within the second image object designated by the second indicator.

9. The display device according to claim 1, wherein the control unit transmits data expressing the second image displayed currently by the display unit to the image supply device when a predetermined operation using the second indicator is accepted.

10. The display device according to claim 1, wherein the first indicator and the second indicator are colored in different colors from each other, and the detection device specifies whether the indicator is the first indicator or the second indicator on the basis of the color of the indicator.

11. The display device according to claim 1, wherein the indicator is in a shape having a first end and a second end, and the detection device specifies the first end as the first indicator and specifies the second end as the second indicator.

12. A display control method for controlling a display device, the method comprising:
   acquiring a first image from an image supply device;
   detecting an indicator and specifying a position of the indicator and whether the indicator is a first indicator or a second indicator;
   setting the second indicator to operate in one of a first operation mode for drawing a second image over the first image based on the position of the indicator, and a second operation mode for performing an operation other than drawing;
   generating the second image based on the specified position and generating a third image by superimposing the second image on the first image;
   designating either the display device or the image supply device as a supply destination of information indicating a position of the second indicator; and
   supplying the information indicating the position of the indicator to the display device which generates the third image if the detected indicator is the first indicator, and supplying the information indicating the position of the indicator to the designated supply destination if the detected indicator is the second indicator,
   wherein
      the image supply device is external to the display device,
      when the second indicator is set to the first operation mode, the display device is designated as the supply destination in the designating, and
      when the second indicator is set to the second operation mode, the image supply device is designated as the supply destination in the designating.

13. A display system comprising:
the display device according to claim 1; and
the image supply device.

* * * * *